C. W. NORMAN.
ATTACHMENT FOR TIRE PUMPS.
APPLICATION FILED APR. 18, 1916.
1,332,565.
Patented Mar. 2, 1920.
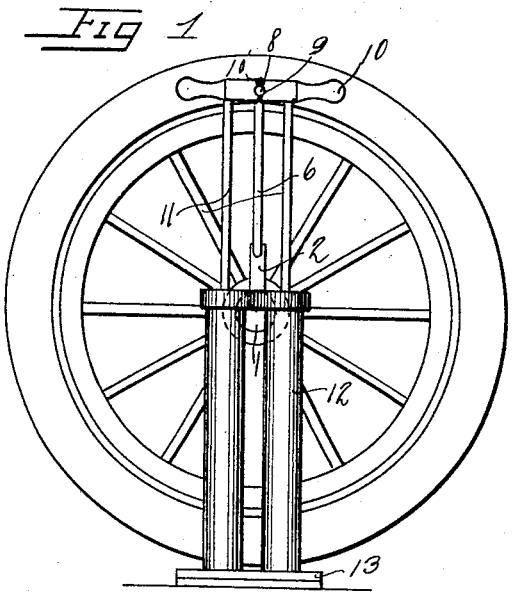
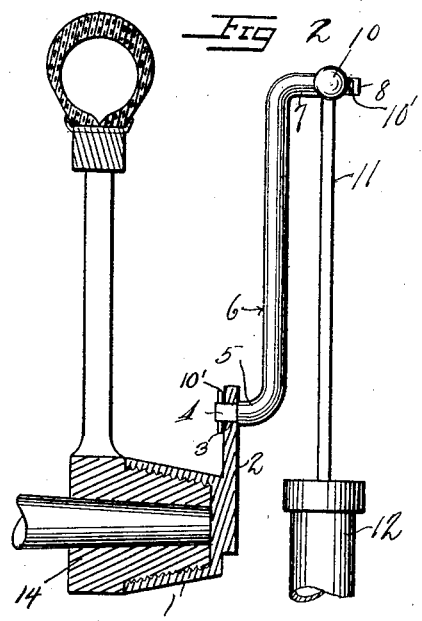
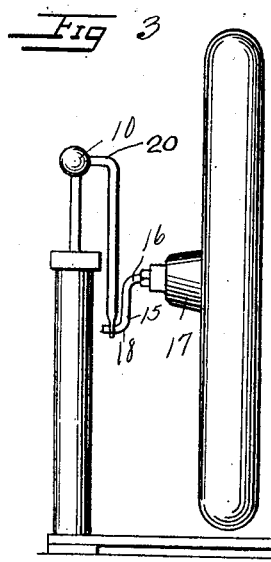
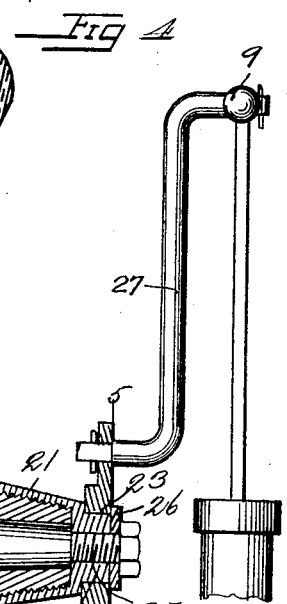
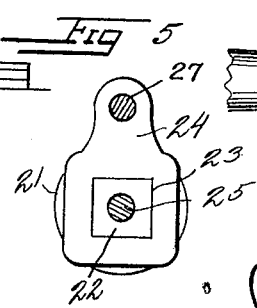

UNITED STATES PATENT OFFICE.

CHARLES W. NORMAN, OF KENOVA, WEST VIRGINIA.

ATTACHMENT FOR TIRE-PUMPS.

1,332,565.

Specification of Letters Patent.

Patented Mar. 2, 1920.

Application filed April 18, 1916. Serial No. 91,967.

*To all whom it may concern:*

Be it known that I, CHARLES W. NORMAN, a citizen of the United States, residing at Kenova, in the county of Wayne, State of West Virginia, have invented certain new and useful Improvements in Attachments for Tire-Pumps; and I do hereby declare the following to be a full, clear, and exact description of the invention, such as will enable others skilled in the art to which it appertains to make and use the same.

The present invention is directed to improvements in devices adapted to be attached to the drive wheel of an automobile for operating the tire pump.

The invention has for an object the provision of means whereby a pump may be easily and quickly coupled to the drive wheel of an automobile to operate the pump.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which:

Figure 1 is a side elevation of the device.

Fig. 2 is a side elevation partly in section.

Fig. 3 is an end elevation of a modified form of the invention.

Fig. 4 is a detailed sectional view of another modified form of the invention.

Fig. 5 is a sectional view on line 5—5 of Fig. 4.

Referring to the drawing 1 indicates a conical cap, the minor end of which has formed integral therewith a crank arm 2, the outer end of which is provided with a bearing 3 said bearing being adapted to receive the reduced end portion 4 of the laterally directed end 5 of a pitman 6. The other end portion of the pitman is turned laterally in the opposite direction from the portion 5, as shown at 7 and is reduced in diameter and is adapted to engage in the bearing 9 formed in the pump handle of the plungers 11. The extensions 4 and 8 are retained in their respective bearings by cotter pins 10′ or the like.

The plungers 11 are engaged in the pump cylinders 12 which are of conventional form and have their lower ends provided with a foot piece 13 whereby the cylinder can be held in a vertical position during its operation. The lifting jack (not shown) rests on the foot piece 13.

The cap 1 is adapted to be connected to the hub 14 after the usual cap is removed from one of the driving wheels of the automobile. Thus it will be seen that automobiles can be jacked up and the drive wheel started which operation will cause the arm 2 to rotate thus operating the pitman 6 so as to reciprocate the plungers 11 to force air under pressure to the tire to be inflated, it being of course understood that the pump cylinder is equipped with the usual air conducting tubes.

In the modified form of the invention as shown in Fig. 3, a crank arm 15 is provided and has its arm 16 threaded into a cap 17, said cap being of the same shape as the cap 1 and is attached in place of the hub cap in the same manner.

The arm 18 of the crank arm 15 is pivotally engaged with the lower end of the pitman 19, the upper end of which is provided with an extension 20 for engaging the pump handle 10.

In the modified form of the invention as shown in Figs. 4 and 5, the cap 21 has its outer end provided with a squared head 22, which is engaged by the socket 23 of a crank arm or plate 24, said plate being retained in place by the screw and washer 25 and 26 respectively. The upper end of the arm or plate 24 is pivotally connected to the lower end of pitman 27, which is connected to the pump handle 9.

What is claimed is:—

1. The combination with a vehicle wheel having a hub provided with an outwardly tapered externally threaded outer end, of a cap having an internally threaded socket tapered correspondingly to the outer end of the hub upon which it is removably screwed, a crank on the cap, and a pitman detachably pivoted to one end of the crank and adapted to be detachably pivoted to a part to be operated thereby on rotation of the wheel.

2. The combination with a wheel hub tapered and threaded at its outer end; of a cap correspondingly tapered and threaded at its inner end to fit the hub and externally angular at its outer end, a crank arm having an angular socket removably fitted to said outer end, means for holding it thereon, and a pitman connected with the crank arm.

3. The combination with a wheel hub tapered and threaded at its outer end; of a cap correspondingly tapered and threaded at its inner end to fit the hub and square at its outer end, a crank arm having a square socket removably fitting said outer end, a screw in the outer extremity of the cap, and a washer between the screw head and crank arm, as described.

In testimony whereof I affix my signature, in the presence of two witnesses.

CHARLES W. NORMAN.

Witnesses:
J. B. SCOTT,
JOHN NYE.